United States Patent
Feng et al.

(10) Patent No.: US 11,282,413 B2
(45) Date of Patent: Mar. 22, 2022

(54) SECURE MULTI-PARTY COMPUTATION METHOD, DEVICE, APPARATUS AND COMPUTER-READABLE STORAGE MEDIUM

(71) Applicant: Baidu Online Network Technology (Beijing) Co., Ltd., Beijing (CN)

(72) Inventors: Zhi Feng, Beijing (CN); Yu Zhang, Beijing (CN); Xiaoning Yu, Beijing (CN); Haosu Guo, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 325 days.

(21) Appl. No.: 16/429,779

(22) Filed: Jun. 3, 2019

(65) Prior Publication Data

US 2020/0090552 A1 Mar. 19, 2020

(30) Foreign Application Priority Data

Sep. 18, 2018 (CN) .......................... 201811087071.4

(51) Int. Cl.
*G09C 1/00* (2006.01)
*G06F 21/60* (2013.01)
*H04L 9/00* (2022.01)

(52) U.S. Cl.
CPC ............. *G09C 1/00* (2013.01); *G06F 21/602* (2013.01); *H04L 9/00* (2013.01); *H04L 9/008* (2013.01); *H04L 2209/46* (2013.01)

(58) Field of Classification Search
CPC ......... G09C 1/00; G06F 21/602; G06F 21/60; H04L 9/00; H04L 9/008; H04L 2209/46
See application file for complete search history.

(56) References Cited

U.S. PATENT DOCUMENTS

2011/0211692 A1* 9/2011 Raykova ............... H04L 9/3218
380/46
2012/0079602 A1* 3/2012 Kolesnikov ........... H04L 9/0662
726/26

(Continued)

FOREIGN PATENT DOCUMENTS

CN 105103487 11/2015

OTHER PUBLICATIONS

Selajev et al., "Yao Garbled Circuits in Secret Sharing-based Secure Multi-party Computation", Cybernetica, Institute of Information Security. 2011. University of Tartu, Institute of Computer Science.

*Primary Examiner* — Shanto Abedin
*Assistant Examiner* — Howard H. Louie
(74) *Attorney, Agent, or Firm* — Knobbe, Martens, Olson & Bear, LLP

(57) ABSTRACT

Embodiments of a secure multi-party computation method are provided. The method can include: dynamically converting a multi-party computation program segment into a first garbled circuit by using a multi-party computation operator of a first main body, and executing garbled gates of the first garbled circuit in sequence through an execution engine of the first main body, to encrypt data of the first main body; transmitting to a second main body the encrypted data of the first main body and identifiers for garbled gates of the first garbled circuit; performing a second encryption on the encrypted data of the first main body by the second main body in sequence according to the received identifiers for the garbled gates of the first garbled circuit, and returning to the first main body a result of the second encryption on the encrypted data of the first main body.

9 Claims, 7 Drawing Sheets

(56) References Cited

U.S. PATENT DOCUMENTS

| | | | |
|---|---|---|---|
| 2012/0233460 A1* | 9/2012 | Kamara | ................ H04L 9/3218 |
| | | | 713/168 |
| 2018/0019868 A1 | 1/2018 | Pe'er et al. | |
| 2018/0019997 A1* | 1/2018 | Chabanne | ........... H04L 63/0861 |
| 2020/0202038 A1* | 6/2020 | Zhang | .................... G16H 50/30 |

* cited by examiner

SECURE MULTI-PARTY COMPUTATION METHOD, DEVICE, APPARATUS AND COMPUTER-READABLE STORAGE MEDIUM

CROSS-REFERENCE TO RELATED APPLICATION

This application claims priority to Chinese Patent Application No. 201811087071.4, filed on Sep. 18, 2018, which is hereby incorporated by reference in its entirety.

TECHNICAL FIELD

The present application relates to the technical field of cryptographic computation, and in particular, to a secure multi-party computation method, device, apparatus and a computer-readable storage medium.

BACKGROUND

Secure multi-party computation (SMC) is to solve the problem of collaborative computation in privacy protection among a group of parties of mutual distrust. The SMC ensures the independence of inputs, and the correctness of the computation, without leaking an input value from a member to other members participating in the computation.

At present, there are conventional multi-party computation libraries such as Fairplay, Oblivm, Obliv-C, FastGC, Spdz and ShareMind. The first generation of multi-party computation libraries, such as Fairplay, CBMC-GC and FastGC, are implemented by compiling a C-like high-level language program into a binary garbled circuit. The second generation of multi-party computation libraries, such as Oblivm, Spdz, ShareMind and Obliv-C, implement programming of multi-party computation using Python or a custom language similar to java, .net. The program is compiled into an intermediate language program to facilitate multi-party computation, which is then executed by a multi-party computation actuator.

However, the existing multi-party computation libraries have the following problems:
(1) The existing multi-party computation programs are all based on custom high-level languages or languages similar to high-level languages, with high learning cost.
(2) A library of programs that can be supported by a custom high-level language or a custom language similar to a high-level language is relatively simple, and a user needs to implement existing functions of a conventional high-level language by himself
(3) Two steps are necessary to complete the generation and execution process of the multi-party computation protocol. The usage cost is extremely high, and the multi-party computation cannot be embedded into the existing service programs and combined with the existing codes.

SUMMARY

A secure multi-party computation method, device, apparatus and a computer-readable storage medium are provided according to embodiments of the present application, so as to at least solve one of the above technical problems in the existing technology.

According to a first aspect, a secure multi-party computation method includes:

dynamically converting a multi-party computation program segment into a first garbled circuit by using a multi-party computation operator of a first main body; and executing garbled gates of the first garbled circuit in sequence through an execution engine of the first main body, to encrypt data of the first main body;

transmitting to a second main body the encrypted data of the first main body and identifiers for garbled gates of the first garbled circuit; and performing a second encryption on the encrypted data of the first main body by the second main body in sequence according to the received identifiers for the garbled gates of the first garbled circuit, and returning to the first main body a result of the second encryption on the encrypted data of the first main body.

In conjunction with the first aspect, in a first implementation of the first aspect of the present application, further includes:

dynamically converting a multi-party computation program segment into a second garbled circuit by using a multi-party computation operator of the second main body, and executing garbled gates of the second garbled circuit in sequence through an execution engine of the second main body, to encrypt data of the second main body;

transmitting the encrypted data of the second main body and identifiers for garbled gates of the second garbled circuit to the first main body from the second main body;

performing a second encryption on the encrypted data of the second main body by the first main body in sequence according to the received identifiers for garbled gates of the second garbled circuit, and returning to the second main body a result of the second encryption on the encrypted data of the second main body.

In conjunction with the first implementation of the first aspect, in a second implementation of the first aspect of the present application, the performing a second encryption on the encrypted data of the first main body by the second main body in sequence according to the received identifiers for the garbled gates of the first garbled circuit, and returning to the first main body a result of the second encryption on the encrypted data of the first main body includes:

determining, by the second main body, garbled gates corresponding to the second garbled circuit by associating the received identifiers for garbled gates of the first garbled circuit with the second garbled circuit;

calculating the received encrypted data of the first main body according to the determined garbled gates, and returning a calculation result to the first main body.

In conjunction with the first implementation of the first aspect, in a third implementation of the first aspect of the present application, the performing a second encryption on the encrypted data of the second main body by the first main body in sequence according to the received identifiers for garbled gates of the second garbled circuit, and returning to the second main body a result of the second encryption on the encrypted data of the second main body includes:

determining, by the first main body, garbled gates corresponding to the first garbled circuit by associating the received identifiers for garbled gates of the second garbled circuit with the first garbled circuit;

calculating the received encrypted data of the second main body according to the determined garbled gates, and returning a calculation result to the second main body.

In conjunction with the first aspect or any one of implementations of the first aspect, in a fourth implementation of the first aspect of the present application, the garbled gate comprises at least one of an AND logic gate, an OR logic gate, and a NOT logic gate.

According to a second aspect, a secure multi-party computation device includes:

a first conversion module configured to dynamically convert a multi-party computation program segment into a first garbled circuit by using a multi-party computation operator of a first main body, and execute garbled gates of the first garbled circuit in sequence through an execution engine of the first main body, to encrypt data of the first main body;

a first transmission module configured to transmit to a second main body the encrypted data of the first main body and identifiers for garbled gates of the first garbled circuit;

a first calculation module configured to perform a second encryption on the encrypted data of the first main body in sequence according to the received identifiers for the garbled gates of the first garbled circuit after the identifiers for the garbled gates of the first garbled circuit and the encrypted data of the first main body are received by the second main body, and return to the first main body a result of the second encryption on the encrypted data of the first main body.

In conjunction with the second aspect, in a first implementation of the second aspect of the present application, the device further includes:

a second conversion module configured to dynamically convert a multi-party computation program segment into a second garbled circuit by using a multi-party computation operator of the second main body, and execute garbled gates of the second garbled circuit in sequence through an execution engine of the second main body, to encrypt data of the second main body;

a second transmission module configured to transmit the encrypted data of the second main body and identifiers for garbled gates of the second garbled circuit to the first main body from the second main body;

a second calculation module configured to perform a second encryption on the encrypted data of the second main body according to the received identifiers for garbled gates of the second garbled circuit after the identifiers for garbled gates of the second garbled circuit and the encrypted data of the second main body are received by the first main body, and return a result of the second encryption on the encrypted data of the second main body.

In conjunction with the first implementation of the second aspect, in a second implementation of the second aspect of the present application, the first calculation module includes:

a first association sub-module configured to determine garbled gates corresponding to the second garbled circuit by associating the received identifiers for garbled gates of the first garbled circuit with the second garbled circuit;

a first calculation sub-module configured to calculate the received encrypted data of the first main body according to the determined garbled gates, and return a calculation result to the first main body.

In conjunction with the first implementation of the second aspect, in a third implementation of the second aspect of the present application, the second calculation module includes:

a second association sub-module configured to determine garbled gates corresponding to the first garbled circuit by associating the received identifiers for garbled gates of the second garbled circuit with the first garbled circuit;

a second calculation sub-module configured to calculate the received encrypted data of the second main body according to the determined garbled gates, and return a calculation result to the second main body.

In conjunction with the second aspect or any one of implementations of the second aspect, in a fourth implementation of the second aspect of the present application, the garbled gate comprises at least one of an AND logic gate, an OR logic gate, and a NOT logic gate.

In a third aspect, in a possible design, the structure of the secure multi-party computation apparatus includes a processor and a memory for storing a program supporting the secure multi-party computation apparatus to perform the secure multi-party computation method of the first aspect described above, the processor being configured to perform the program stored in the memory. The secure multi-party computation device may further include a communication interface for communication between the secure multi-party computation apparatus and other devices or communication networks.

In a fourth aspect, a computer-readable storage medium is provided for storing computer software instructions used by the secure multi-party computation apparatus, which includes a program for executing the secure multi-party computation method of the first aspect as described above.

In the embodiments of the present application, a garbled circuit is dynamically generated according to a multi-party computation operator, and is executed by an execution engine in a pipelining manner. This enables the compilation and execution processes to be performed simultaneously, thereby improving the efficiency of the compilation and execution. For example, a multi-party computation program segment may be written directly through a Java advanced language without a special compilation.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive. A secure multi-party computation method and device are mainly provided according to embodiments of the present application, and the technical solutions thereof are described in detail by way of the following embodiments, respectively.

A secure multi-party computation method and device are provided according to embodiments of the present application. The specific processing flows and principles of the secure multi-party computation method and device according to the embodiments in the present application will be described in detail as below.

Figure 1:
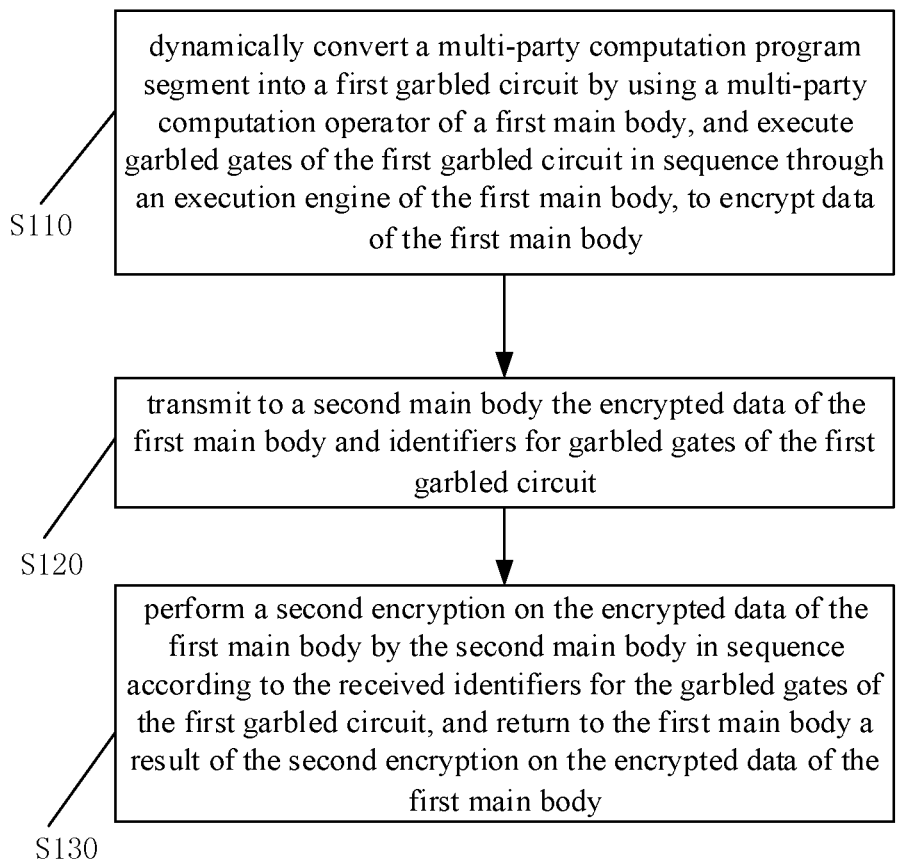
FIG. 1 is a flowchart of a secure multi-party computation method according to an embodiment of the present application.

FIG. 1 is a flowchart of a secure multi-party computation method according to an embodiment in the present application. The security multi-party computation method according to the embodiment in the present application may include the following steps S110 to S130.

In S110, a multi-party computation program segment is converted dynamically into a first garbled circuit by using a multi-party computation operator of a first main body, and garbled gates in the first garbled circuit are executed in sequence through an execution engine of the first main body, to encrypt data of the first main body.

In one embodiment, multi-party computation program segments may be written by using Java Software Development Kit (Java SDK). The written program segments may be embedded in any Java code and then operate in their respective Java Virtual Machines (JVMs).

Next, a program segment may be converted into an executable garbled circuit through a multi-party computation operator in the Java library. The multi-party computation operator includes an integer computation protocol of a digital operation, a decimal computation protocol of a fixed number of bits, a scientific computation and matrix computation protocol. Additionally, the garbled circuit is a logic circuit including a plurality of garbled gates for encrypting data in the main body. For example, the garbled gate is at least one of an AND logic gate, an OR logic gate, and a NOT logic gate.

The garbled circuit may be executed by the execution engine in a pipelining manner. That is, while a program segment is being converted into a garbled circuit, the garbled circuit may be executed by the execution engine, so that the conversion and the execution can be performed simultaneously.

In S120, the encrypted data of the first main body and identifiers for garbled gates of the first garbled circuit are transmitted to a second main body.

In one embodiment, identifiers for the garbled gates in the garbled circuit may be sequentially transmitted to the second main body in a defined order.

In S130, a second encryption is performed on the encrypted data by the second main body in sequence according to the received identifiers for garbled gates of the first garbled circuit, and the result of the second encryption is returned to the first main body.

Figure 2:
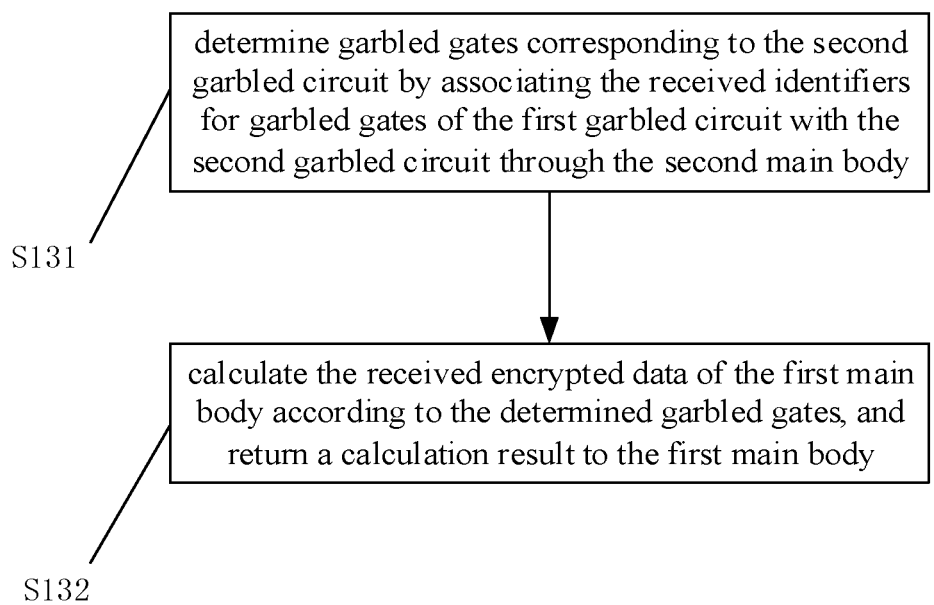
FIG. 2 is a specific flowchart of step S130 of an embodiment of the present application.

As shown in FIG. 2, in one embodiment, the step S130 includes the following steps S131 to S132.

In S131, garbled gates corresponding to a second garbled circuit are determined by associating the received identifiers for garbled gates of the first garbled circuit with the second garbled circuit through the second main body.

In one embodiment, when the identifiers for garbled gates of the first main body is received by the second main body, garbled gates corresponding to the received identifiers for garbled gates are determined in the second garbled circuit generated by the second main body.

In S132, the received encrypted data of the first main body is calculated according to the determined garbled gates, and the calculation result is returned to the first main body.

In one embodiment, after completing the calculation of one garbled gate, the calculation result is used as the input value for the next garbled gate. In this case, the previous calculation result may be discarded without being stored, to save memory space. In the case of calculation of a garbled gate, the garbled gate can automatically be trigged when an input item of the garbled gate is ready. For example, if the current garbled gate is an AND logic gate or an OR logic gate, two input items are required; and if the current garbled gate is a NOT logic gate, one input item is required.

Figure 3:
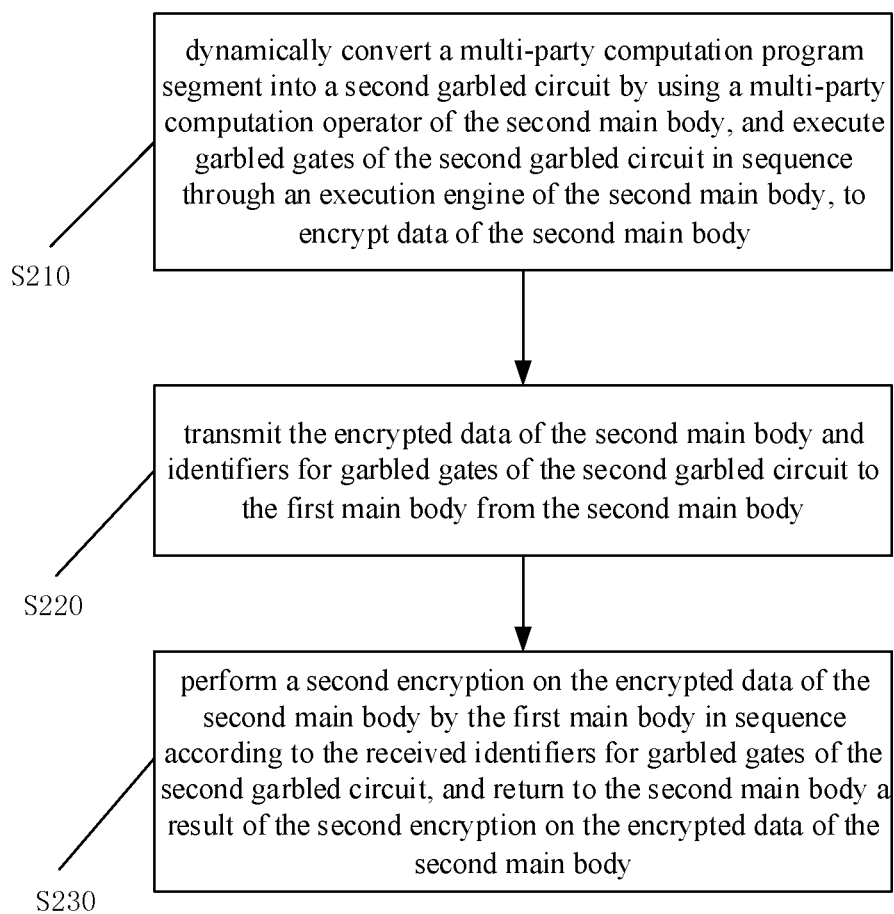
FIG. 3 is a flowchart of a secure multi-party computation method according to another embodiment of the present application.

As shown in FIG. 3, in one embodiment, the secure multi-party computation method may further include the following steps S210 to S230.

In S210, a multi-party computation program segment is converted dynamically into a second garbled circuit by using a multi-party computation operator of a second main body, and garbled gates of the second garbled circuit are executed in sequence through an execution engine of the second main body, to encrypt the data of the second main body.

In S220, the encrypted data of the second main body and identifiers for garbled gates of the second garbled circuit are transmitted to the first main body from the second main body.

In S230, a second encryption is performed on the encrypted data of the second main body by the first main body in sequence according to the received identifiers for garbled gates of the second garbled circuit, and the result of the second encryption is returned to the second main body.

Figure 4:
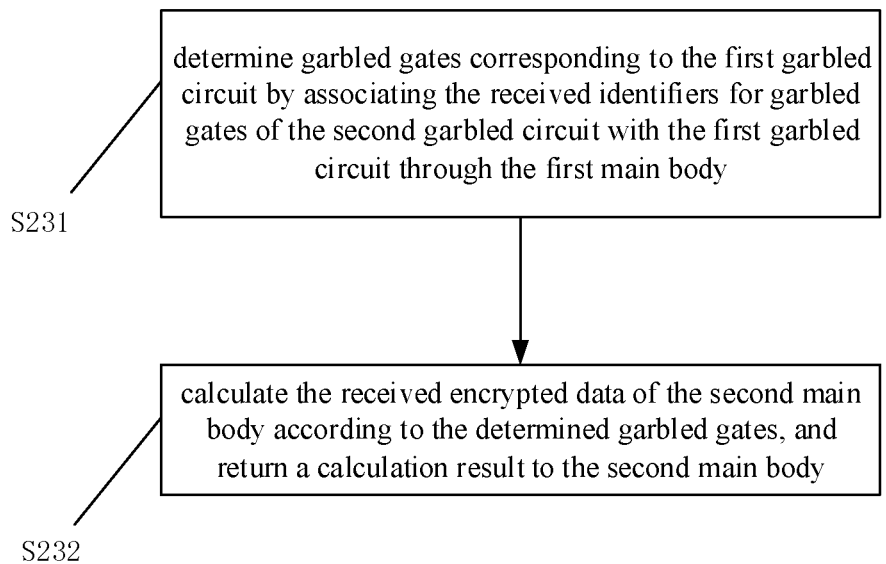
FIG. 4 is a specific flowchart of step S230 of another embodiment of the present application.

As shown in FIG. 4, the step S230 may include steps S231 to S232.

In S231, garbled gates corresponding to a first garbled circuit are determined by associating the received identifiers for garbled gates of the second garbled circuit with the first garbled circuit through the first main body.

In S232, the received encrypted data of the second main body is calculated according to the determined garbled gates, and the calculation result is returned to the second main body.

In this embodiment, the steps and principles for encrypting the data of the second main body by the second main body are similar to the steps and principles of the first main body in the above embodiment. Therefore, a detailed description is omitted here.

In the following, the procedure and principles of the secure multi-party computation method according to embodiments of the application will be described by taking two executive bodies as an example.

Figure 5:
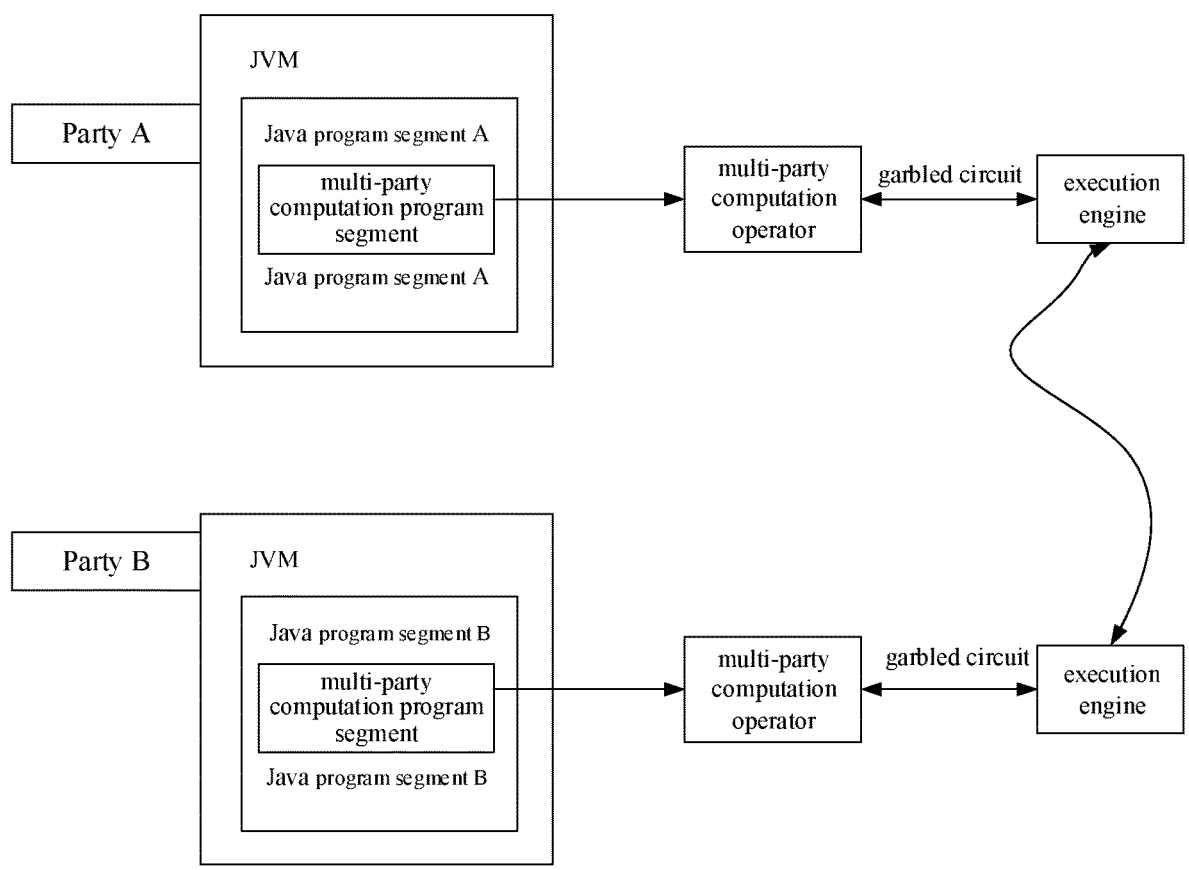
FIG. 5 is a schematic diagram of implementation of a secure multi-party computation method of an embodiment of the present application.

As shown in FIG. 5, for example, there are currently two executive bodies, i.e., party A and party B.

Firstly, a multi-party computation program segment is written in each JVM. Next, the multi-party computation program segment is converted into a garbled circuit executable in a pipelining manner, according to a multi-party computation operator protocol in the Java library. Then, the respective data is encrypted by the garbled circuit.

Execution of the respective execution engines and transmission are based on a specific algorithm protocol.

For example, and the encrypted data and identifiers for garbled gates in a garbled circuit may be transmitted to party B by party A. Next, corresponding garbled gates are determined in a garbled circuit of party B according to the identifiers for the garbled gates by party B. Then, a second encryption is performed on the received encrypted data in sequence. Finally, the second encryption result is returned to party A.

At the same time, identifiers for garbled gates in a garbled circuit and the encrypted data may also be transmitted to party A by party B. Next, corresponding garbled gates are determined in a garbled circuit of party A according to the identifiers for the garbled gates by party A. Then, a second encryption is performed on the received encrypted data in sequence. Finally, the second encryption result is returned to party B.

Finally, a common calculation may be completed by party A and party B without leaking their own data.

In the embodiments of the present application, a program may be directly written through a Java advanced language without special compilation. During the execution of the Java program, a garbled circuit is dynamically generated according to an operator for computation. And the garbled circuit is executed by the execution engine in a pipelining manner. This enables the compilation and execution processes to be performed simultaneously, while ensuring execution efficiency.

In addition, various multi-party computation operator protocols can be implemented based on the Java library, such as an integer computing protocol that can support digital operation, a decimal computing protocol of a fixed number of digits, a scientific computing and matrix computing protocol.

Figure 6:
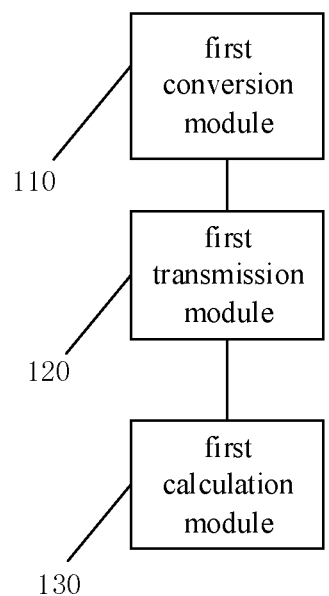
FIG. 6 is a connection block diagram of a secure multi-party computation device according to another embodiment of the present application.

As shown in FIG. 6, a secure multi-party computation device is further provided according to another embodiment of the present application. The device includes the following modules 110 to 130.

A first conversion module 110 is configured to dynamically convert a multi-party computation program segment into a first garbled circuit by using a multi-party computation operator of a first main body, and execute garbled gates of the first garbled circuit in sequence through an execution engine of the first main body, to encrypt data of the first main body.

A first transmission module 120 is configured to transmit to a second main body the encrypted data of the first main body and identifiers for garbled gates of the first garbled circuit.

A first calculation module 130 is configured to perform a second encryption on the encrypted data of the first main body in sequence according to the received identifiers for garbled gates of the first garbled circuit after the identifiers for garbled gates of the first garbled circuit and the encrypted data of the first main body are received by the second main body, and return the result of the second encryption to the first main body.

Figure 7:
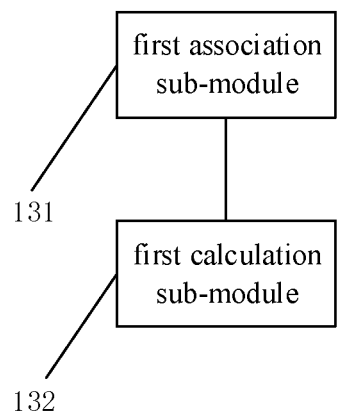
FIG. 7 is an internal block diagram of a first calculation module according to another embodiment of the present application.

As shown in FIG. 7, the first calculation module 130 includes the following sub-modules 131 to 132.

A first association sub-module 131 is configured to determine garbled gates corresponding to a second garbled circuit by associating the received identifiers for garbled gates of the first garbled circuit with the second garbled circuit through the second main body.

A first calculation sub-module 132 is configured to calculate the received encrypted data of the first main body according to the determined garbled gates, and return the calculation result to the first main body.

Figure 8:
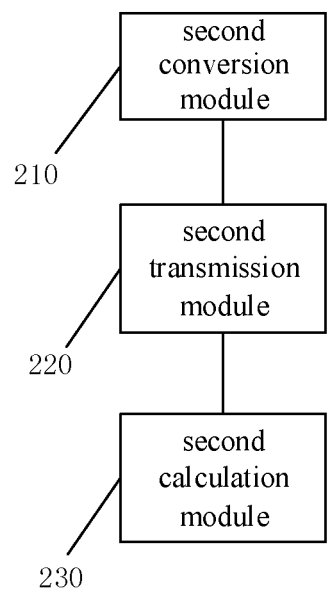
FIG. 8 is a connection block diagram of a secure multi-party computation device according to another embodiment of the present application.

As shown in FIG. 8, the secure multi-party computation device according to another embodiment of the present application further includes the following modules 210 to 230.

A second conversion module 210 is configured to dynamically convert a multi-party computation program segment into a second garbled circuit by using a multi-party computation operator of a second main body, and execute garbled gates of the second garbled circuit in sequence through an execution engine of the second main body, to encrypt the data of the second main body.

A second transmission module 220 is configured to transmit the encrypted data of the second main body and identifiers for garbled gates of the second garbled circuit to the first main body from the second main body.

A second calculation module 230 is configured to perform a second encryption calculation on the encrypted data of the second main body in sequence according to the received identifiers for garbled gates of the second garbled circuit after the identifiers for garbled gates of the second garbled circuit and the encrypted data of the second main body are received by the first main body, and return the result of the second encryption to the second main body.

Figure 9:
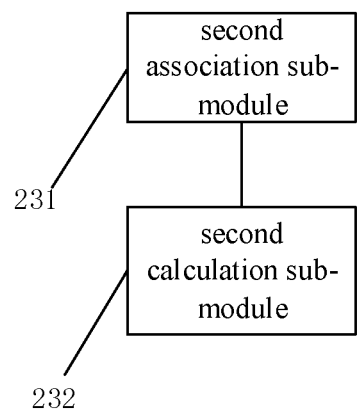
FIG. 9 is an internal block diagram of a second calculation module according to another embodiment of the present application.

As shown in FIG. 9, the second calculation module 230 includes the following sub-modules 231 to 232.

A second association sub-module 231 is configured to determine garbled gates corresponding to a first garbled circuit by associating the received identifiers for garbled gates of the second garbled circuit with the first garbled circuit through the first main body.

A second calculation sub-module 232 is configured to calculate the received encrypted data of the second main body according to the determined garbled gates, and return the calculation result to the second main body.

In one embodiment, the garbled gate in the present embodiment may include at least one of an AND logic gate, an OR logic gate, and a NOT logic gate.

Figure 10:
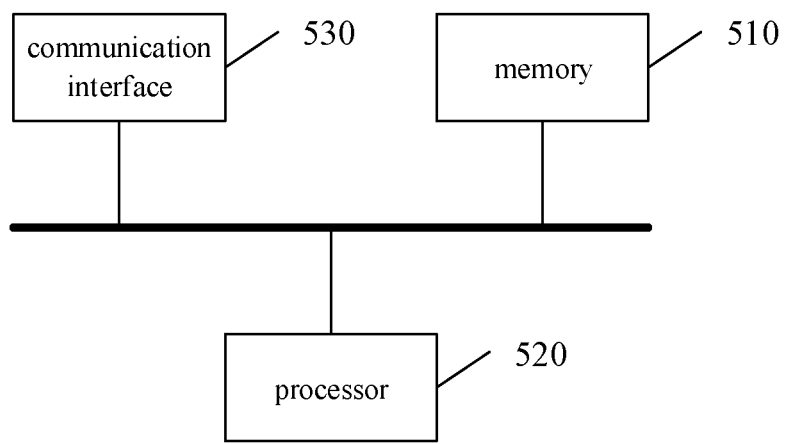
FIG. 10 is a block diagram of a secure multi-party computation apparatus according to another embodiment of the present application.

A secure multi-party computation apparatus is provided according to another embodiment of the present application. As shown in FIG. 10, the apparatus includes a memory 510 and a processor 520. The memory 510 stores a computer program executable on the processor 520. When the processor 520 executes the computer program, the secure multi-party computation method in the foregoing embodiment is implemented. The number of the memory 510 and the processor 520 may be one or more.

The apparatus further includes:

a communication interface 530 configured to communicate with an external device and exchange data.

The memory 510 may include a high-speed RAM memory and may also include a non-volatile memory, such as at least one magnetic disk memory.

If the memory 510, the processor 520, and the communication interface 530 are implemented independently, the memory 510, the processor 520, and the communication interface 530 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 10, but it does not mean that there is only one bus or one type of bus.

Optionally, in a specific implementation, if the memory 510, the processor 520, and the communication interface 530 are integrated on one chip, the memory 510, the processor 520, and the communication interface 530 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus.

The computer readable medium of the embodiments of the present application may be a computer readable signal medium or a computer readable storage medium or any combination of the two. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

In embodiments of the present application, a computer-readable signal medium may include a data signal propagated in a baseband or as part of a carrier, wherein computer-readable program code is carried. Such propagated data signals may take a variety of forms, including, but not limited to, electromagnetic signals, optical signals, or any of the above-mentioned suitable combinations. A computer-readable signal medium may also be any computer-readable medium other than a computer-readable storage medium that may transmit, propagate, or transmit programs for instruction execution systems, input methods, or devices, or in conjunction with them. Program code included on a computer readable medium may be transmitted in any suitable medium, including, but not limited to, wireless, wire, optical cable, radio frequency (RF), etc., or any suitable combination as described above.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGAs), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, the functional units in the various embodiments of the present application may be integrated into one processing module, may be physically present alone, or may be integrated into one module by two or more units. The integrated modules may be implemented in the form of hardware or software functional modules. The integrated modules may also be stored in a computer-readable storage medium if implemented in the form of a software functional module and sold or used as independent products. The storage medium may be a read-only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A secure multi-party computation method, comprising:
dynamically converting a multi-party computation program segment into a first garbled circuit by using a multi-party computation operator of a first main body, and executing garbled gates of the first garbled circuit in sequence through an execution engine of the first main body, to encrypt data of the first main body;
transmitting to a second main body the encrypted data of the first main body and identifiers for garbled gates of the first garbled circuit; and
performing a second encryption on the encrypted data of the first main body by the second main body in sequence according to the received identifiers for the garbled gates of the first garbled circuit, and returning to the first main body a result of the second encryption on the encrypted data of the first main body,
wherein the method further comprises:
dynamically converting a second multi-party computation program segment into a second garbled circuit by using a multi-party computation operator of the second main body, and executing garbled gates of the second garbled circuit in sequence through an execution engine of the second main body, to encrypt data of the second main body;
transmitting the encrypted data of the second main body and identifiers for garbled gates of the second garbled circuit to the first main body from the second main body; and
performing a second encryption on the encrypted data of the second main body by the first main body in sequence according to the received identifiers for garbled gates of the second garbled circuit, and returning to the second main body a result of the second encryption on the encrypted data of the second main body.

2. The secure multi-party computation method according to claim 1, wherein the performing a second encryption on the encrypted data of the first main body by the second main body in sequence according to the received identifiers for the garbled gates of the first garbled circuit, and returning to the first main body a result of the second encryption on the encrypted data of the first main body comprises:
determining, by the second main body, garbled gates corresponding to the second garbled circuit by associating the received identifiers for garbled gates of the first garbled circuit with the second garbled circuit; and
calculating the result of the second encryption to return to the first main body according to the determined garbled gates, and returning a calculation result to the first main body.

3. The secure multi-party computation method according to claim 1, wherein the performing a second encryption on the encrypted data of the second main body by the first main body in sequence according to the received identifiers for garbled gates of the second garbled circuit, and returning to the second main body a result of the second encryption on the encrypted data of the second main body comprises:
determining, by the first main body, garbled gates corresponding to the first garbled circuit by associating the received identifiers for garbled gates of the second garbled circuit with the first garbled circuit; and
calculating the result of the second encryption to return to the second main body according to the determined garbled gates, and returning a calculation result to the second main body.

4. The secure multi-party computation method according to claim 1, wherein at least one garbled gate comprises at least one of an AND logic gate, an OR logic gate, or a NOT logic gate.

5. A secure multi-party computation device, comprising:
one or more processors; and
a memory communicatively connected with the one or more processors,
wherein the memory stores one or more programs, that, when executed by the one or more processors, cause the one or more processors to:
dynamically convert a multi-party computation program segment into a first garbled circuit by using a multi-party computation operator of a first main body, and execute garbled gates of the first garbled circuit in sequence through an execution engine of the first main body, to encrypt data of the first main body;
transmit to a second main body the encrypted data of the first main body and identifiers for garbled gates of the first garbled circuit; and
perform a second encryption on the encrypted data of the first main body in sequence according to the received identifiers for the garbled gates of the first garbled circuit after the identifiers for the garbled gates of the first garbled circuit and the encrypted data of the first main body are received by the second main body, and return to the first main body a result of the second encryption on the encrypted data of the first main body,
wherein the one or more programs, when executed by the one or more processors, cause the one or more processors further to:
dynamically convert a second multi-party computation program segment into a second garbled circuit by using a multi-party computation operator of the second main body, and execute garbled gates of the second garbled circuit in sequence through an execution engine of the second main body, to encrypt data of the second main body;
transmit the encrypted data of the second main body and identifiers for garbled gates of the second garbled circuit to the first main body from the second main body; and
perform a second encryption on the encrypted data of the second main body according to the received identifiers for garbled gates of the second garbled circuit after the identifiers for garbled gates of the second garbled circuit and the encrypted data of the second main body are received by the first main body, and return a result of the second encryption on the encrypted data of the second main body.

6. The secure multi-party computation device according to claim 5, wherein the one or more programs, when executed by the one or more processors, cause the one or more processors further to:
determine garbled gates corresponding to the second garbled circuit by associating the received identifiers for garbled gates of the first garbled circuit with the second garbled circuit; and calculate the result of the second encryption to return to the first main body according to the determined garbled gates, and return a calculation result to the first main body.

7. The secure multi-party computation device according to claim 5, wherein the one or more programs, when executed by the one or more processors, cause the one or more processors further to:

determine garbled gates corresponding to the first garbled circuit by associating the received identifiers for garbled gates of the second garbled circuit with the first garbled circuit; and calculate the result of the second encryption to return to the second main body according to the determined garbled gates, and return a calculation result to the second main body.

8. The secure multi-party computation device according to claim 5, wherein at least one garbled gate comprises at least one of an AND logic gate, an OR logic gate, or a NOT logic gate.

9. A non-transitory computer-readable storage medium, in which a computer program is stored, wherein the computer program, when executed by a processor, causes the processor to implement the method of claim 1.

* * * * *